United States Patent [19]
Yoshikawa et al.

[11] Patent Number: 5,332,796
[45] Date of Patent: Jul. 26, 1994

[54] ORGANOPOLYSILOXANES AND METHODS FOR MAKING

[75] Inventors: Yuji Yoshikawa, Annaka; Mitsuhiro Takarada, Takasaki, both of Japan

[73] Assignee: Shin-Etsu Chemical Co., Ltd., Tokyo, Japan

[21] Appl. No.: 57,631

[22] Filed: May 7, 1993

[30] Foreign Application Priority Data

May 8, 1992 [JP] Japan .................. 4-143226

[51] Int. Cl.$^5$ .............................. C08G 77/04
[52] U.S. Cl. ........................... 528/15; 528/26; 528/23; 528/31; 528/37; 525/474; 556/439
[58] Field of Search ............ 528/15, 26, 31, 23.37; 525/474

[56] References Cited

U.S. PATENT DOCUMENTS 3,198,766  8/1965  Nitzsche et al. .
4,273,697  6/1981  Sumimura et al. .
4,503,208  3/1985  Lin et al. .................. 556/440
4,777,233 10/1988  Suzuki et al. ............... 528/26
5,051,465  9/1991  Yoshida et al. .

FOREIGN PATENT DOCUMENTS 0110371   6/1984  European Pat. Off. .
0196169  10/1986  European Pat. Off. .
0463522   1/1992  European Pat. Off. .
0484119   5/1992  European Pat. Off. .
 131806   7/1978  Fed. Rep. of Germany .
2450856   3/1980  France .

*Primary Examiner*—Melvyn I. Marquis
*Attorney, Agent, or Firm*—Birch, Stewart, Kolasch & Birch

[57] ABSTRACT

Novel organopolysiloxanes containing both a (meth)acryl group and a carboxyl group in a molecule are well compatible with organic resins and useful as resin modifiers.

12 Claims, 6 Drawing Sheets

ORGANOPOLYSILOXANES AND METHODS FOR MAKING

BACKGROUND OF THE INVENTION

1. Field of the Invention

This invention relates to novel organopolysiloxanes suitable as modifiers for organic resins in various applications including painting and coating compositions, molding materials, medical materials and methods for preparing the same.

2. Prior Art

In a wide variety of fields including painting and coating compositions, molding materials and medical materials, organopolysiloxanes having an organic functional group are widely used as resin modifiers for imparting heat resistance, weathering resistance, mold release, formability, workability, and thermal shock resistance to organic reins.

Known organopolysiloxanes having an organic functional group include dimethylpolysiloxanes having an alcoholic hydroxyl group at each end (JP-B 8718/1979), dimethylpolysiloxanes having a functional group at each end (JP-A 217515/1983 and 123502/1984), methylpolysiloxanes having a functional group on a branch (JP-B 18968/1986 and 28880/1986), and methylphenylpolysiloxanes having alcoholic hydroxyl groups at each end and a branch. Also JP-A 294962/1990 and 294963/1990 disclose organopolysiloxanes having distinct functional groups such as (meth)acryl, epoxy and alcoholic hydroxyl groups in a molecule.

However, organopolysiloxanes having both (meth)acryl and carboxyl groups in a molecule are unknown.

SUMMARY OF THE INVENTION

Making extensive investigations of organic organopolysiloxanes suitable as resin modifiers, we have found that an organopolysiloxane of average compositional formula (1) is obtained by adding c mol of at least one unsaturated compound selected from the group consisting of acrylic acid, methacrylic acid and undecylenic acid to a SiH group of an organohydrogenpolysiloxane of average compositional formula (3). We have also found that an organopolysiloxane of average compositional formula (2) is obtained by adding 2 mol of at least one unsaturated compound selected from the group consisting of acrylic acid, methacrylic acid and undecylenic acid to SiH of an organohydrogenpolysiloxane of the average compositional formula (4). The reaction schemes are shown below.

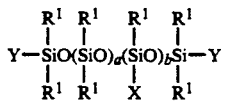 (3)

acrylic acid, methacrylic acid or undecylenic acid

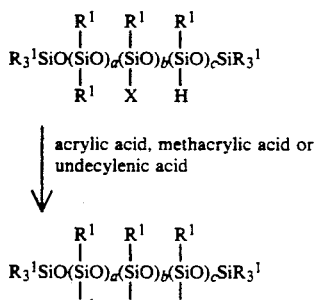 (1)

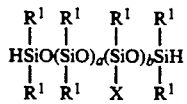 (4)

acrylic acid, methacrylic acid or undecylenic acid (2)

$$Y-\underset{\underset{R^1}{|}}{\overset{\overset{R^1}{|}}{Si}}O(SiO)_a(SiO)_b\underset{\underset{R^1}{|}}{\overset{\overset{R^1}{|}}{Si}}-Y$$
$\quad R^1 \quad R^1 \quad X \quad R^1$ In the formulae, X is an acryloxypropyl or methacryloxypropyl group, Y is an organic group selected from the group consisting of carboxyethyl, carboxypropyl and carboxydecyl groups, $R^1$ is an alkyl group having 1 to 6 carbon atoms or a phenyl group, letters a, b and c are integers in the range: $0 \leq a \leq 100$, $1 \leq b \leq 20$, and $1 \leq c \leq 20$.

In order to prevent dehydrogenation during addition reaction of an unsaturated compound selected from the group consisting of acrylic acid, methacrylic acid and undecylenic acid to an organohydrogenpolysiloxane of average compositional formula (3) or (4), it is advantageous to modify such an unsaturated compound by replacing active hydrogen of the carboxyl group thereof by an alkyl or silyl group. By adding the unsaturated compound derivative to the organohydrogenpolysiloxane and subjecting the reaction product to hydrolysis or desilylation, there is obtained an organopolysiloxane containing both (meth)acryl and carboxyl groups in a molecule as represented by average compositional formula (1) or (2).

Also we have found that the organopolysiloxanes of average compositional formula (1) or (2) can be prepared by equilibrating a mixture of a compound of average compositional formula (5) or (8) and a compound of average compositional formula (6) or by hydrolyzing and equilibrating a mixture of a compound of average compositional formula (5) or (8) and a compound of average compositional formula (7) in the presence of water.

 (5)

 (8)

 (6)

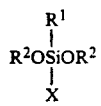 (7)

In the formulae, X, Y, R¹, a and c are as defined above, R² is a methyl or ethyl group, and letter d is an integer in the range: $3 \leq d \leq 10$.

Due to the inclusion of both (meth)acryl and carboxyl functional groups in a molecule, the organopolysiloxanes of average compositional formulae (1) and (2) are well compatible with organic resins such as epoxy resins and acrylic resins and effective for imparting heat resistance, weathering resistance, formability, workability, adhesion, lubricity, water solubility and other desirable properties to these resins while they contriubute to an improvement in strength by virtue of distinct crosslinking points and accomplish modification of organic resins through grafting. Since these organopolysiloxanes have two distinct functional groups, they can be used in two distinct crosslinking procedures by utilizing the difference in reactivity therebetween or separately polymerized and crosslinked, leading to many advantages as resin modifiers. The carboxyl group contained therein has the function of imparting lubricity, mold releasability and water solubility and is especially effective in forming anionic water-soluble resins through amine neutralization. Since the acryl or methacrylic group contained therein can undergo radical polymerization by itself or copolymerization with another polymerizable monomer, there can be obtained a functional group-containing siloxane graft acrylic polymer which is otherwise difficult to synthesize. By further incorporating a diphenylsiloxane or methylphenylsiloxane unit into these organopolysiloxanes, they can be substantially improved in compatibility with organic resins.

DETAILED DESCRIPTION OF THE INVENTION

Figure 1:
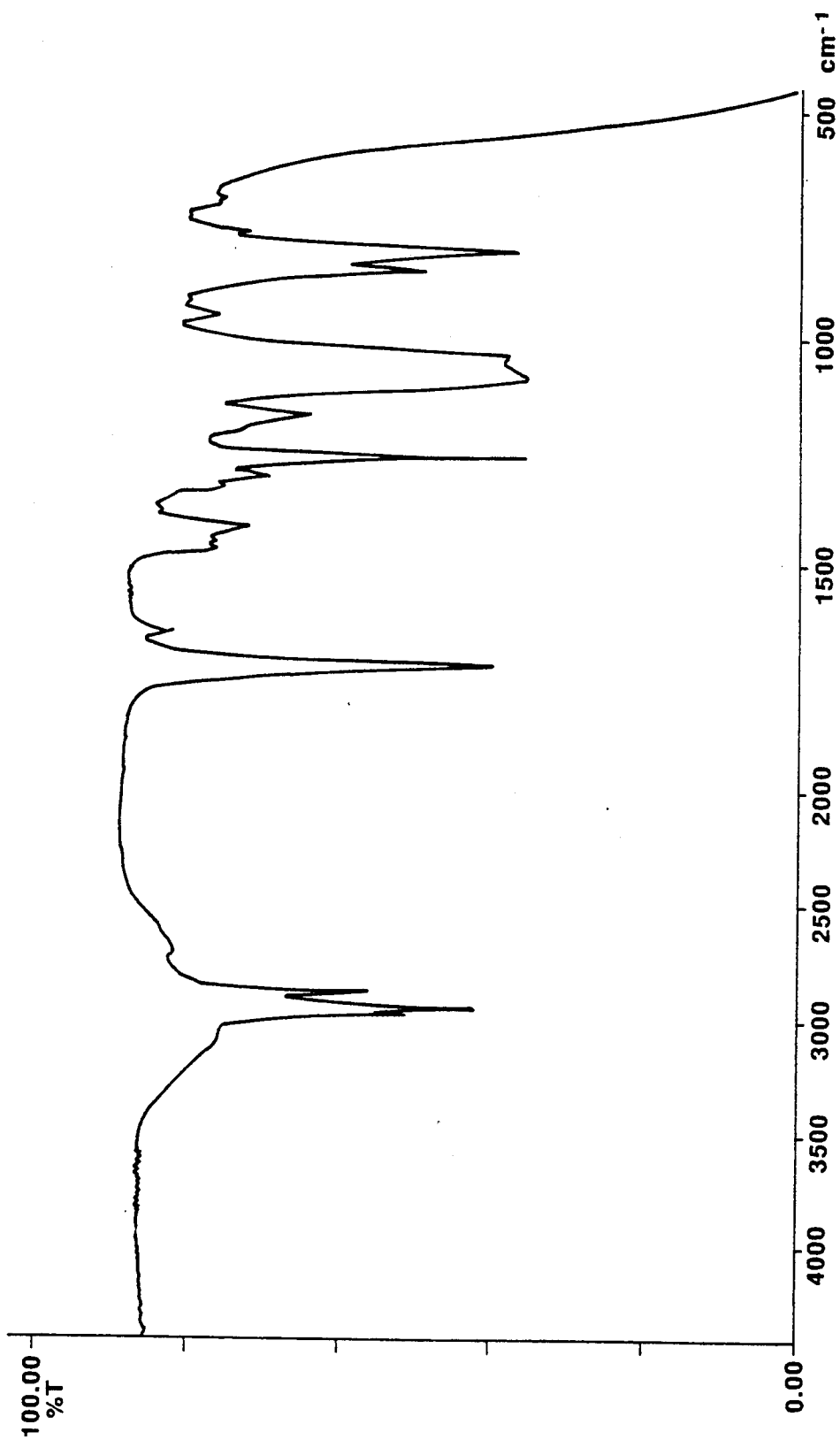
FIG. 1 is an infrared absorption spectrum of the product of Example 1.

The present invention provides organopolysiloxanes represented by the following average compositional formulae (1) and (2).

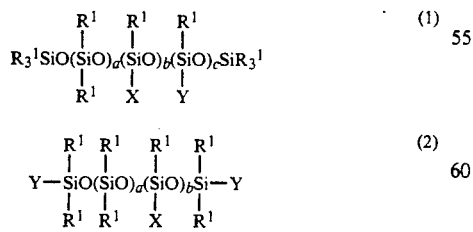

In the formulae, X is an acryloxypropyl or methacryloxypropyl group, Y is an organic group selected from the group consisting of carboxyethyl, carboxypropyl and carboxydecyl groups, R¹ is an alkyl group having 1 to 6 carbon atoms or a phenyl group, letters a, b and c are integers in the range: $0 \leq a \leq 100$, $1 \leq b \leq 20$, and $1 \leq c \leq 20$.

More particularly, X is a 2-acryloxypropyl, 3-acryloxypropyl, 2-methacryloxypropyl or 3-methacryloxypropyl group. R¹ is an alkyl group having 1 to 6 carbon atoms such as a methyl, ethyl and propyl group or a phenyl group, with methyl and phenyl groups being preferred in practice. It is desired to use a mixture of these groups. For example, by incorporating a diphenylsiloxane unit or a methylphenylsiloxane unit into a siloxane of a dimethylsiloxane unit backbone, the siloxane can be more improved in reactivity and compatibility with organic resins. Especially, phenyl group may preferably be contained in an amount of 5 to 50 mol % in R¹. More than 50 mol % of phenyl group may adversely affect compatibility with organic resins. Letters a, b and c are integers in the above-defined range. If the siloxane is too long (a, b and c exceed their upper limits), it undesirably becomes viscous, difficult to handle and less compatible with organic resins.

The organopolysiloxanes of formula (1) or (2) can be readily prepared in high yields through a hydrosilylation reaction between an organohydrogenpolysiloxane of average compositional formula (3) or (4) and an unsaturated compound selected from the group consisting of acrylic acid, methacrylic acid and undecylenic acid.

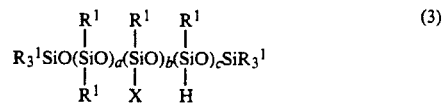

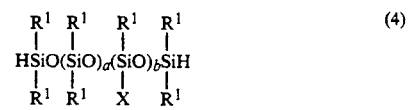

The organohydrogenpolysiloxane of average compositional formula (3) or (4) can be readily prepared by effecting an equilibration reaction of tetramethylcyclotetrasiloxane or tetraalkyldisiloxane, a dialkoxysilane containing a functional group X or a hydrolyzate thereof, and a cyclic polysiloxane or disiloxane in the presence of sulfuric acid or sulfonic acid. Illustrative, non-limiting examples of the organohydrogenpolysiloxane are given below. In the following formulae, Me is a methyl group, Ph is a phenyl group, and X' is a 3-acryloxypropyl or 3-methacryloxypropyl group.

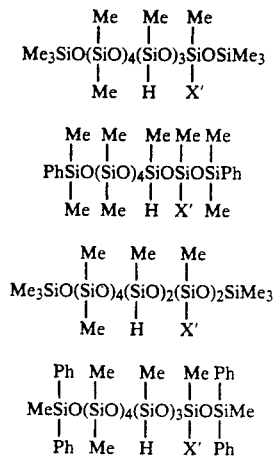

-continued $$\text{MeSiO(SiO)}_4\text{(SiO)}_2\text{(SiO)}_2\text{SiMe}$$
with substituents Ph/Me/Me/Me/Ph on top and Ph/Me/H/X'/Ph on bottom $$\text{Me}_3\text{SiO(SiO)}_2\text{(SiO)}_3\text{SiOSiMe}_3$$
with Ph/Me/Me on top and Ph/H/X' on bottom $$\text{Me}_3\text{SiO(SiO)}_2\text{(SiO)}_2\text{(SiO)}_2\text{SiMe}_3$$
with Ph/Me/Me on top and Ph/H/X' on bottom $$\text{PhSiO(SiO)}_2\text{(SiO)}_3\text{SiOSiPh}$$
with Me/Ph/Me/Me/Me on top and Me/Ph/H/X'/Me on bottom $$\text{PhSiO(SiO)}_2\text{(SiO)}_2\text{(SiO)}_2\text{SiPh}$$
with Me/Ph/Me/Me/Me on top and Me/Ph/H/X'/Me on bottom $$\text{MeSiO(SiO)}_2\text{(SiO)}_3\text{SiOSiMe}$$
with Ph/Ph/Me/Me/Ph on top and Ph/Ph/H/X'/Ph on bottom $$\text{MeSiO(SiO)}_2\text{(SiO)}_2\text{(SiO)}_2\text{SiMe}$$
with Ph/Ph/Me/Me/Ph on top and Ph/Ph/H/X'/Ph on bottom $$\text{Me}_3\text{SiO(SiO)}_4\text{(SiO)}_3\text{SiOSiMe}_3$$
with Me/Me/Me on top and Ph/H/X' on bottom $$\text{Me}_3\text{SiO(SiO)}_4\text{(SiO)}_2\text{(SiO)}_2\text{SiMe}_3$$
with Me/Me/Me on top and Ph/H/X' on bottom $$\text{Me}_3\text{SiO(SiO)}_4\text{(SiO)}_3\text{SiOSiMe}_3$$
with Me/Me/Me on top and $C_3H_7$/H/X' on bottom $$\text{Me}_3\text{SiO(SiO)}_4\text{(SiO)}_2\text{(SiO)}_2\text{SiMe}_3$$
with Me/Me/Me on top and $C_3H_7$/H/X' on bottom $$\text{HSiO(SiO)}_4\text{SiOSiH}$$
with Me/Me/Me/Me on top and Me/Me/X'/Me on bottom $$\text{HSiO(SiO)}_4\text{(SiO)}_2\text{SiH}$$
with Me/Me/Me/Me on top and Me/Me/X'/Me on bottom $$\text{HSiO(SiO)}_4\text{(SiO)}_2\text{SiOSiH}$$
with Me/Me/Ph/Me/Me on top and Me/Me/Ph/X'/Me on bottom $$\text{HSiO(SiO)}_4\text{(SiO)}_2\text{(SiO)}_2\text{SiH}$$
with Me/Me/Ph/Me/Me on top and Me/Me/Ph/X'/Me on bottom $$\text{HSiO(SiO)}_4\text{(SiO)}_2\text{SiOSiH}$$
with Me/Me/Ph/Me/Me on top and Me/Me/Me/X'/Me on bottom $$\text{HSiO(SiO)}_4\text{(SiO)}_2\text{(SiO)}_2\text{SiH}$$
with Me/Me/Ph/Me/Me on top and Me/Me/Me/X'/Me on bottom Preferably the hydrosilylation reaction between an organohydrogenpolysiloxane of formula (3) or (4) and an unsaturated compound is effected in the presence of a platinum catalyst. Any of well-known platinum catalysts conventionally used in hydrosilylation reaction may be used although chloroplatinic acid is preferred in practice. The platinum catalyst is added in a catalytic amount, typically about 2 to 400 ppm based on the organohydrogenpolysiloxane.

Suitable conditions may be selected for the hydrosilylation reaction. Preferred conditions include a temperature of about 60° to 120° C. and a time of about 2 to 8 hours. In order to help control the viscosity and temperature of the reaction system, a suitable solvent may be used, for example, aromatic hydrocarbon solvents such as benzene, toluene and xylene and aliphatic hydrocarbon solvents such as hexane, heptane and octane.

In order to prevent dehydrogenation during the hydrosilylation reaction, it is advantageous to add an unsaturated compound derivative to an organohydrogenpolysiloxane of formula (3) or (4). The unsaturated compound derivative is obtained by replacing active hydrogen of the carboxyl group of an unsaturated compound (acrylic acid, methacrylic acid or undecylenic acid) by an alkyl or silyl group. Preferred are methyl esters, ethyl esters, butyl esters of acrylic acid, methacrylic acid and undecylenic acid as well as acrylic acid, methacrylic acid and undecylenic acid silylated with a silylating agent such as hexamethyldisilazane. Where these unsaturated compound derivatives are used, addition reaction is followed by hydrolysis and desilylation for coupling off the protective group, resulting in the compounds of formula (1) or (2).

Also the organopolysiloxanes of formula (1) or (2) can be prepared by equilibrating a compound of average compositional formula (5) or (8) with a compound of average compositional formula (6) or by hydrolyzing and equilibrating a compound of average compositional formula (5) or (8) with a compound of average compositional formula (7) in the presence of water.

$$R_3^1\text{SiO(SiO)}_a\text{(SiO)}_c\text{SiR}_3^1 \quad (5)$$
with $R^1$/$R^1$ on top and $R^1$/Y on bottom $$Y-\text{SiO(SiO)}_a\text{Si}-Y \quad (8)$$
with $R^1$/$R^1$/$R^1$ on top and $R^1$/$R^1$/$R^1$ on bottom

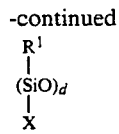 (6)

 (7)

In the formulae, X, Y, R¹, a and c are as defined above, R² is a methyl or ethyl group, and letter d is an integer in the range: $3 \leq d \leq 10$.

More particularly, a carboxyl-containing polysiloxane of formula (5) or (8) and a compound of formula (6) are subject to equilibration reaction, preferably in the presence of an acid, especially conc. sulfuric acid or trifluoromethanesulfonic acid. Alternatively, a carboxyl-containing polysiloxane of formula (5) or (8) and a compound of formula (7) are subject to equilibration reaction in the presence of water and preferably in the presence of an acid, especially conc. sulfuric acid or trifluoromethanesulfonic acid. It is to be noted that the carboxyl-containing polysiloxane of formula (5) or (8) can be obtained by adding acrylic acid, methacrylic acid, undecylenic acid or esters or silylated ones thereof to hydrogenpolysiloxane followed by optional post-treatment. Alternatively, it can be obtained by effecting equilibration reaction of a compound of formula (9) shown below with a disiloxane and a cyclic polysiloxane in the presence of sulfuric acid or sulfonic acid and heating the reaction product in acidic conditions, thereby converting the cyano group into a carboxyl group.

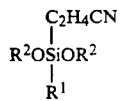 (9)

The carboxyl-containing polysiloxane of formula (8) may also be obtained by equilibrating a compound of formula (10) shown below with a cyclic polysiloxane.

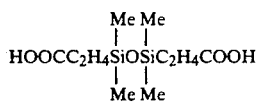 (10)

Illustrative, non-limiting examples of the carboxyl-containing polysiloxane of formulae (5) and (8) are given below.

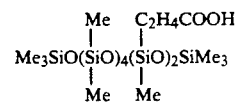

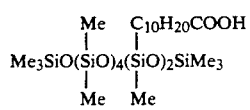

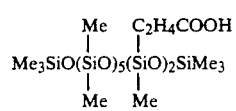

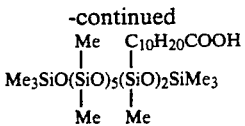

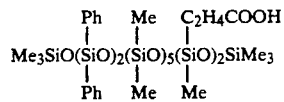

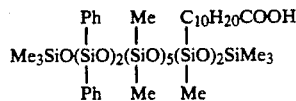

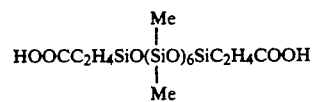

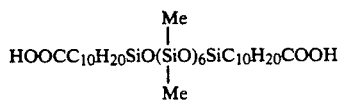

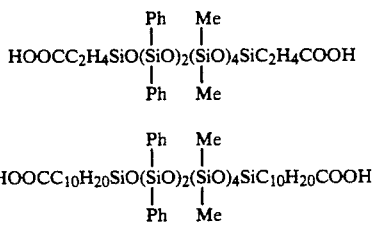

Catalysts are used for effecting equilibration among the above-mentioned compounds. Preferred catalysts are concentrated sulfuric acid and trifluoromethanesulfonic acid. Equilibration can take place when catalysts are added in an amount of 0.5 to 20% by weight of the reactants. The reaction system may be heated if desired. By heating the reaction system at a temperature of about 60° to 80° C., for example, equilibration is completed within about 2 to 20 hours. Less than 0.5% by weight of the catalyst (acid) would fail to promote equilibration whereas more than 20% by weight of the catalyst could decompose the (meth)acryl group.

After equilibration, the reaction product is worked up in a conventional manner, for example, by washing, recovering the compound of formula (1) or (2).

The organopolysiloxanes of the invention are useful modifiers for organic resins in various applications including painting and coating compositions, molding materials, and medical materials.

There have been described organopolysiloxanes containing both a (meth)acryl group and a carboxyl group in a molecule which are well compatible with organic resins. They can be incorporated into resins by copolymerizing the (meth)acryl group with another radical polymerizable monomer whereas the carboxyl group imparts such properties as lubricity, mold releasability and water solubility. The method of the invention allows for easy synthesis of such organopolysiloxanes in high yields.

EXAMPLE

Examples of the present invention are given below by way of illustration and not by way of limitation.

Example 1

A flask was charged with 40 grams of toluene, 51.2 grams of $CH_2=CHC_8H_{16}COOSiMe_3$ and 0.1 gram of a 2% ethanol solution of chloroplatinic acid. To the flask heated at 80° C., 83.8 grams of a hydrogenpolysiloxane of the average compositional formula shown below was added dropwise over two hours. Thereafter the reaction mixture was aged for two hours at 80° C. After the disappearance of a Si-H absorption peak (2160 cm$^{-1}$) was confirmed by means of an infrared spectrometer, the reaction mixture was cooled to room temperature. Then 12.2 grams of 0.05N hydrochloric acid was added dropwise to the reaction mixture, which was agitated for two hours at room temperature. The reaction mixture was washed with water, separated from the toluene by vacuum distillation, and filtered, thereby isolating 114.6 grams of an addition product (yield 95%). Based on the physical properties measured, the product was identified to have the following average compositional formula.

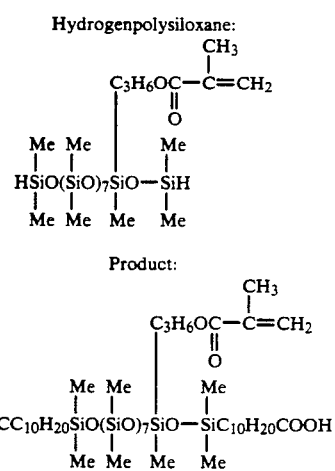

Viscosity: 56 centistokes (25° C.)
Elemental analysis: Found: C 48.5%, H 8.6% Calc.: C 47.8%, H 9.1%
$^1$H-NMR (acetone 2.0 ppm standard)
0.07 57H
0.53 6H
1.23 34H
1.93 3H
2.34 4H
4.10 2H
5.53 1H
6.09 1H
IR absorption spectrum: FIG. 1

Example 2

A flask was charged with the reactants shown below and after agitation, 0.2 grams of trifluoromethanesulfonic acid was slowly added thereto. The reaction mixture was aged for 5 hours at 60° C. and then cooled to room temperature. Water, 0.1 gram, was added to the reaction mixture, which was agitated for one hour. Then 3.0 grams of sodium hydrogen-carbonate and 3.0 grams of anhydrous sodium sulfate were added to the reaction mixture, which was agitated for 3 hours. By filtration, 94.3 grams of a product was isolated (yield 96%). Based on the physical properties measured, the product was identified to have the following average compositional formula.

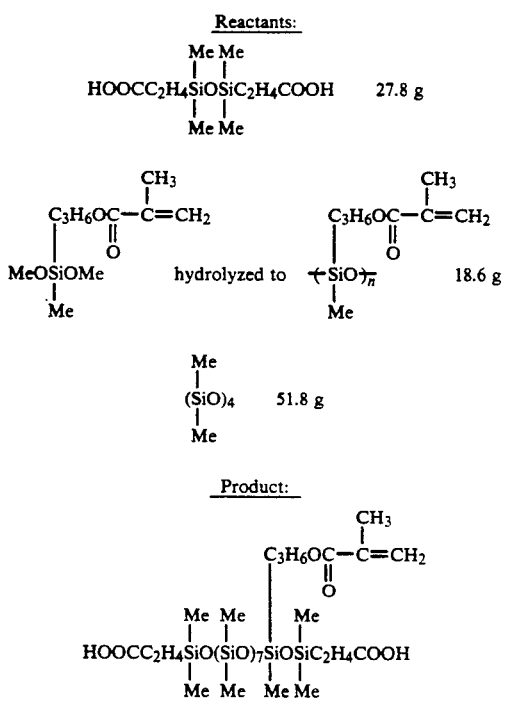

Figure 2:
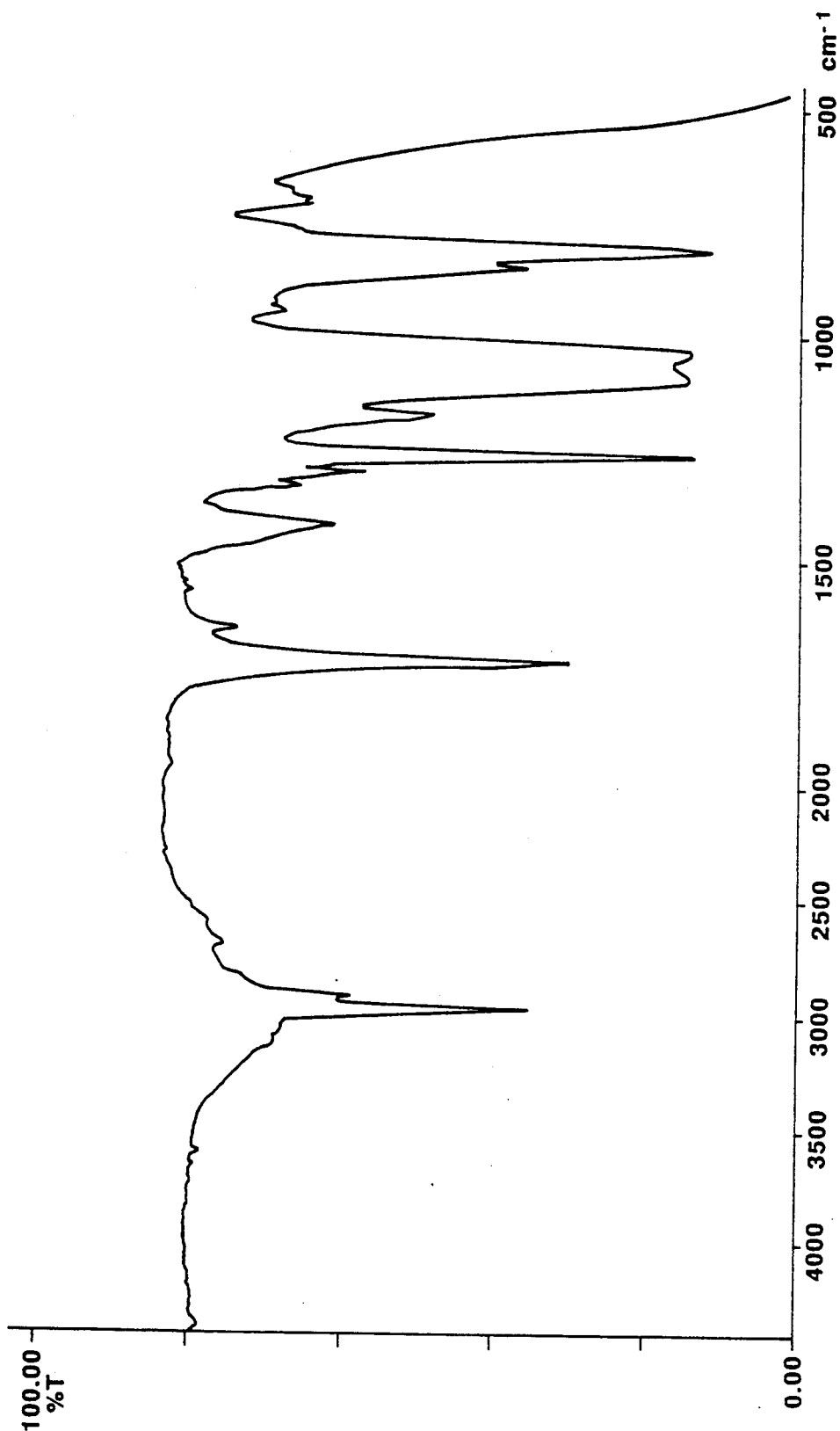
FIG. 2 is an infrared absorption spectrum of the product of Example 2.

Viscosity: 81 centistokes (25° C.)
Elemental analysis: Found: C 40.2%, H 7.1% Calc.: C 39.1%, H 7.9%
$^1$H-NMR (acetone 2.0 ppm standard)
0.06 57H
0.60 6H
1.31 2H
1.98 3H
2.30 4H
4.05 2H
5.41 1H
5.90 1H
IR absorption spectrum: FIG. 2

Example 3

A flask was charged with 36.8 grams of $CH_2=CHC_8H_{16}COOH$, and 0.1 gram of a 2% ethanol solution of chloroplatinic acid. To the flask heated at 80° C., 108.6 grams of a hydrogenpolysiloxane of the average compositional formula shown below was added dropwise over two hours. Thereafter the reaction mixture was aged for two hours at 80° C. After the disappearance of a Si-H absorption peak (2160 cm$^{-1}$) was confirmed by means of an infrared spectrometer, the reaction mixture was cooled to room temperature. The reaction mixture was filtered, thereby isolating 136.7 grams of an addition product (yield 94%). Based on the physical properties measured, the product was identified to have the following average compositional formula.

Hydrogenpolysiloxane:

-continued

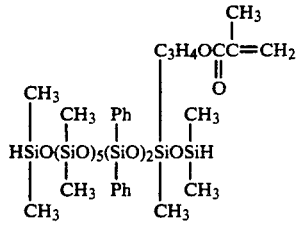

Product:

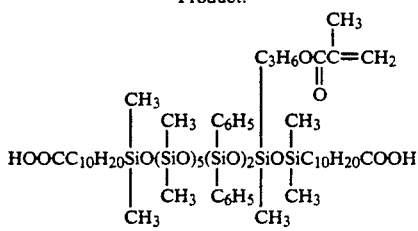

Figure 3:
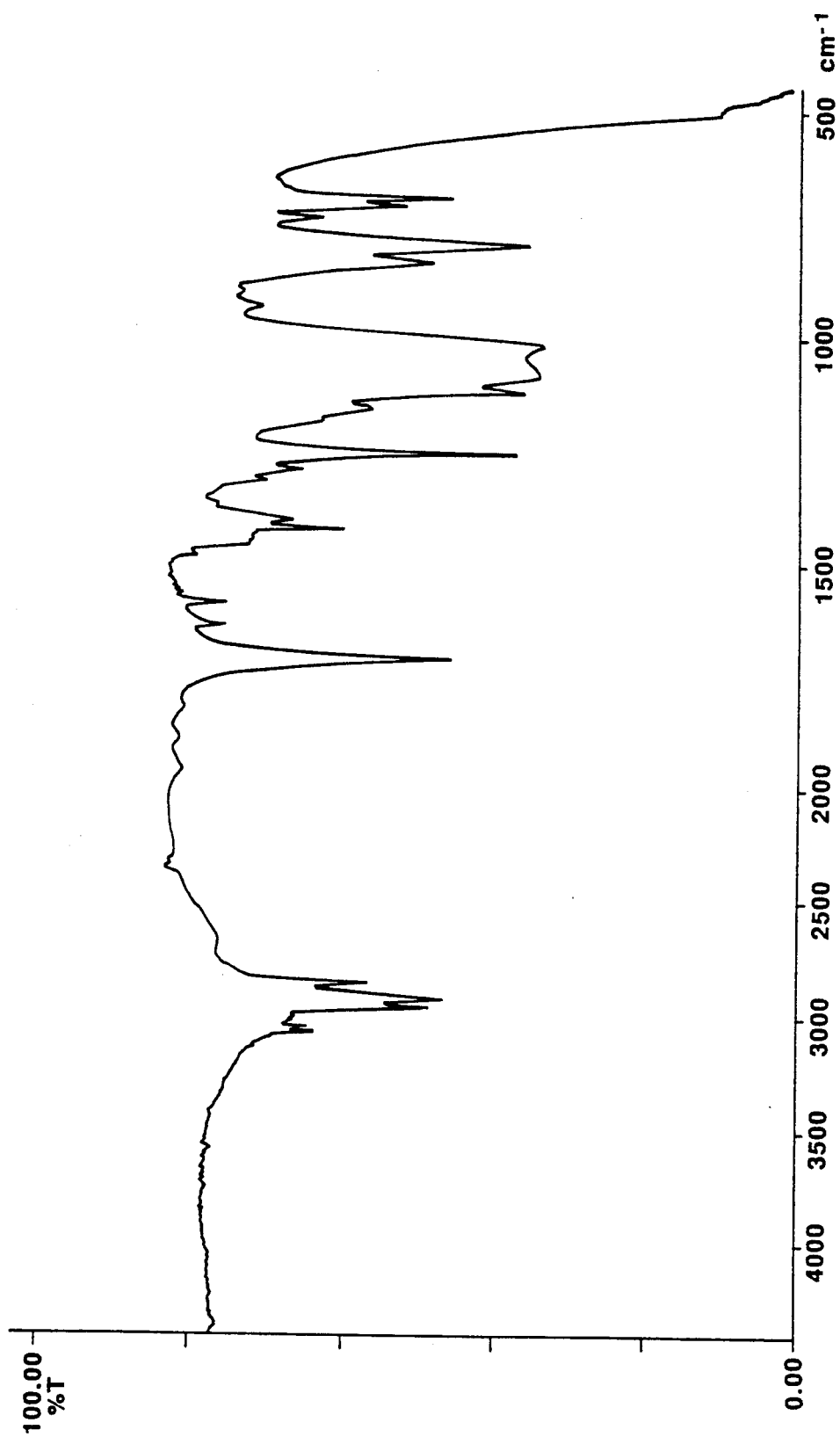
FIG. 3 is an infrared absorption spectrum of the product of Example 3.

Viscosity: 235 cs (25° C.)
Elemental analysis: Found: C: 54.0%, H: 8.0% Calc. C: 52.8%, H: 8.1%
$^1$H-NMR (acetone 2.0 ppm standard)
0.09 45H
0.57 6H
1.24 34H
2.00 3H
2.41 4H
4.12 2H
5.55 1H
6.10 1H
7.30 20H
IR absorption spectrum: FIG. 3

Example 4

A flask was charged with 27.6 grams of $CH_2=CHC_8H_{16}COOH$, and 0.1 gram of a 2% ethanol solution of chloroplatinic acid. To the flask heated at 80° C., 109.6 grams of a hydrogenpolysiloxane of the average compositional formula shown below was added dropwise over two hours.

Hydrogenpolysiloxane:

$$(CH_3)_3SiO(SiO)_{25}(SiO)_3Si(CH_3)_3$$
with $CH_3$ and H substituents

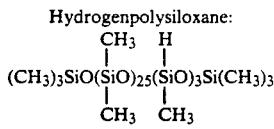

Thereafter the reaction mixture was aged for two hours at 80° C. After the disappearance of a Si-H absorption peak (2160 cm$^{-1}$) was confirmed by means of an infrared spectrometer, the reaction mixture was cooled to room temperature.

Next, 9.3 grams of a hydrolyzate:

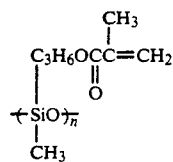

which was obtained by hydrolyzing the compound having the following formula:

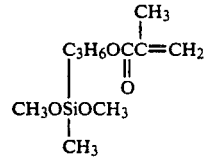

was added to the reaction mixture. After agitation, 0.2 grams of trifluoromethanesulfonic acid was added slowly. Thereafter the reaction mixture was aged for three hours at room temperature. 0.1 gram of water was added to the reaction mixture, which was agitated for one hour. Then 3.0 grams of sodium hydrogen-carbonate and 3.0 grams of anhydrous sodium sulfate were added to the reaction mixture, which was agitated for 3 hours. By filtration, 139. 2 grams of a product was isolated (yield 95%). Based on the physical properties measured, the product was identified to have the following average compositional formula.

Product:

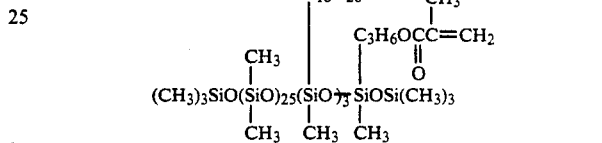

Figure 4:
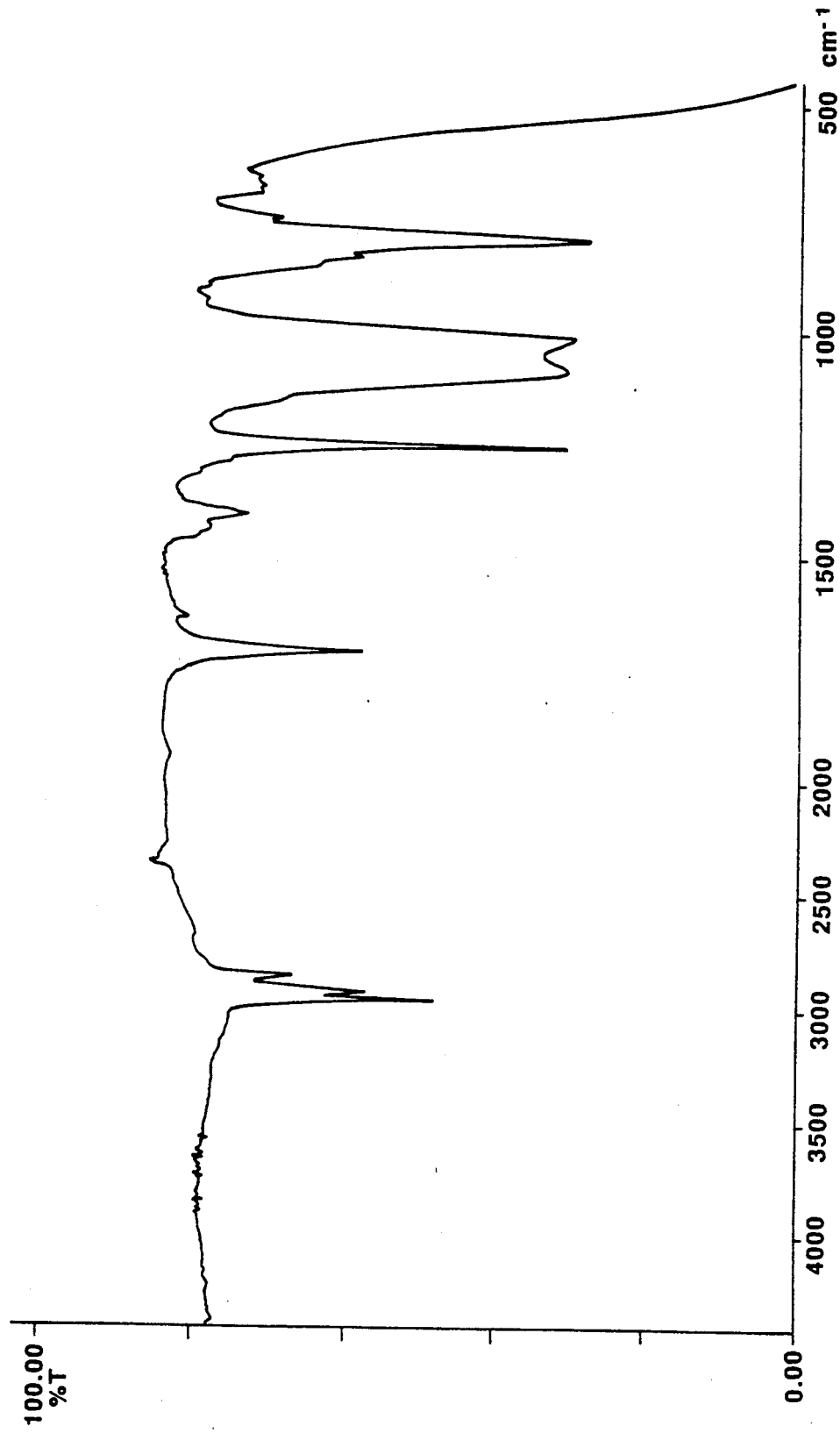
FIG. 4 is an infrared absorption spectrum of the product of Example 4.

Viscosity: 277 cs (25° C.)
Elemental analysis: Found: C: 41.5%, H: 8.4% Calc. C: 41.0%, H: 8.7%
$^1$H-NMR (acetone 2.0 ppm standard)
0.08 180H
0.54 8H
1.27 50H
1.91 3H
2.40 6H
4.12 2H
5.60 1H
6.12 1H
IR absorption spectrum: FIG. 4

Example 5

A flask was charged with 40 grams of toluene, 76.8 grams of $CH_2=CHC_8H_{16}COOSiMe_3$, and 0.1 gram of a 2% ethanol solution of chloroplatinic acid. To the flask heated at 80° C., 85.8 grams of a hydrogenpolysiloxane of the average compositional formula shown below was added dropwise over two hours. Thereafter the reaction mixture was aged for two hours at 80° C. After the disappearance of a Si-H absorption peak (2160 cm$^{-1}$) was confirmed by means of an infrared spectrometer, the reaction mixture was cooled to room temperature. Then 3.3 grams of 0.05N hydrochloric acid was added dropwise to the reaction mixture, which was agitated for two hours at room temperature. The reaction mixture was washed with water, separated from the toluene by vacuum distillation, and filtered, thereby isolating 132.5 grams of an addition product (yield 94%). Based on the physical properties measured, the prodct was identified to have the following average compositional formula.

Hydrogenpolysiloxane:

-continued

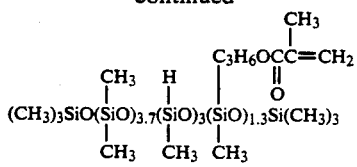

Product:

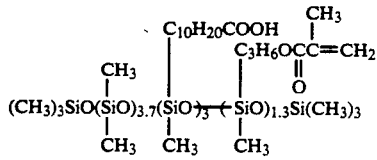

Figure 5:
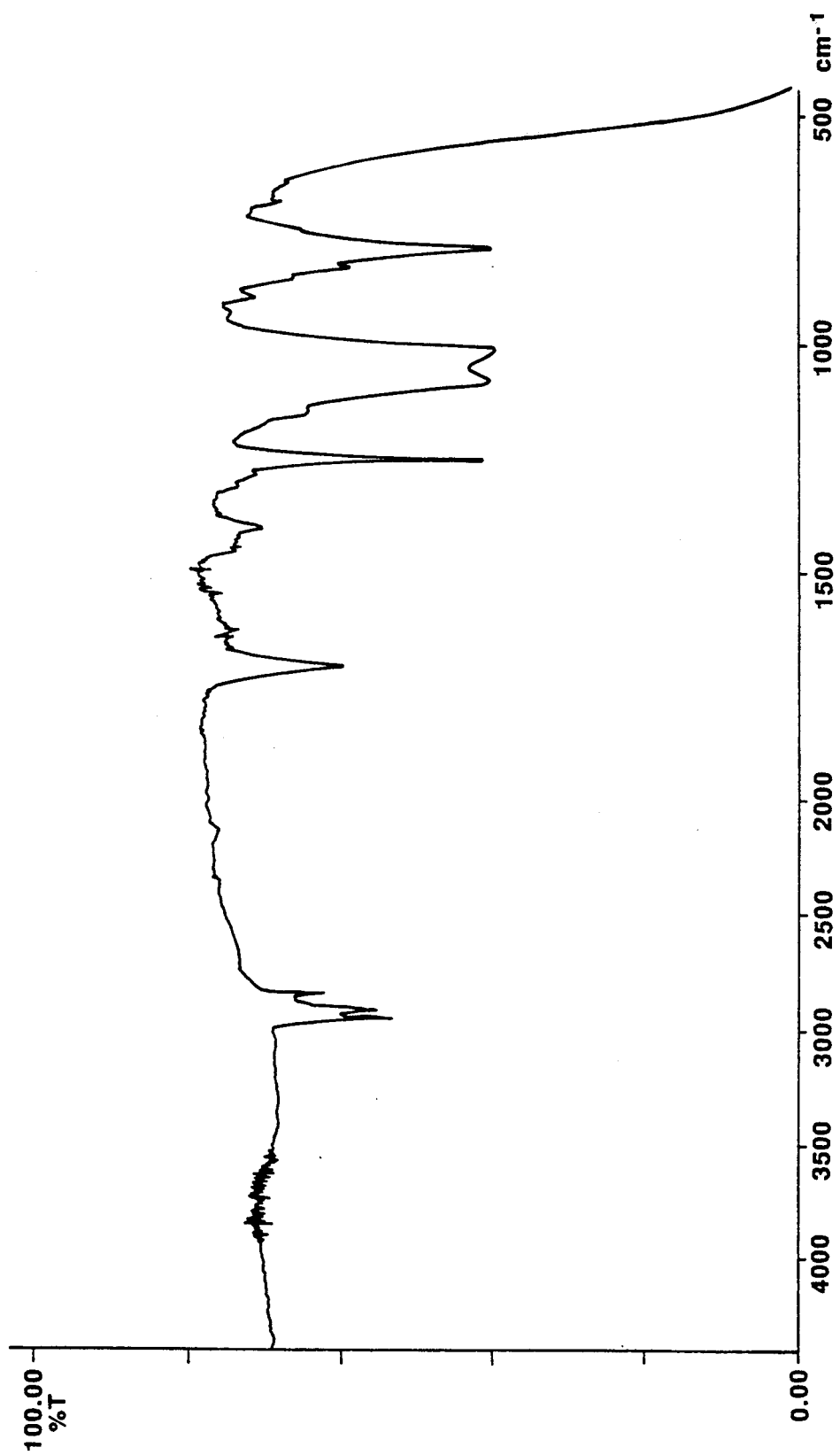
FIG. 5 is an infrared absorption spectrum of the product of Example 5.

Viscosity: 135 cs (25° C.)
Elemental analysis: Found: C: 50.1%, H: 9.2% Calc. C: 50.9%, H: 9.3%
$^1$H-NMR (acetone 2.0 ppm standard)
0.07 53H
0.50 9H
1.21 51H
1.89 4H
2.30 6H
4.00 3H
5.41 1.3H
6.00 1.3H
IR absorption spectrum: FIG. 5

Example 6

A flask was charged with 36.8 grams of $CH_2=CHC_8H_{16}COOH$ and 0.1 gram of a 2% ethanol solution of chloroplatinic acid. To the flask heated at 80° C., 83.8 grams of a hydrogenpolysiloxane of the average compositioal formula shown below was added dropwise over two hours. Thereafter the reaction mixture was aged for two hours at 80° C. After the disappearance of a Si-H absorption peak (2160 cm$^{-1}$) was confirmed by means of an infrared spectrometer, the reaction mixture was cooled to room temperature. By filtration, 114.6 grams of an addition product was isolated (yield 95%). Based on the physical properties measured, the product was identified to have the following average compositional formula.

Hydrogenpolysiloxane:

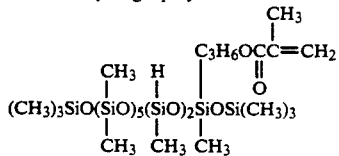

Product:

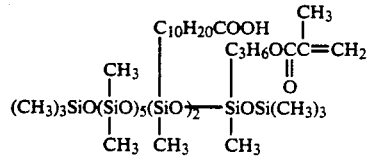

Figure 6:
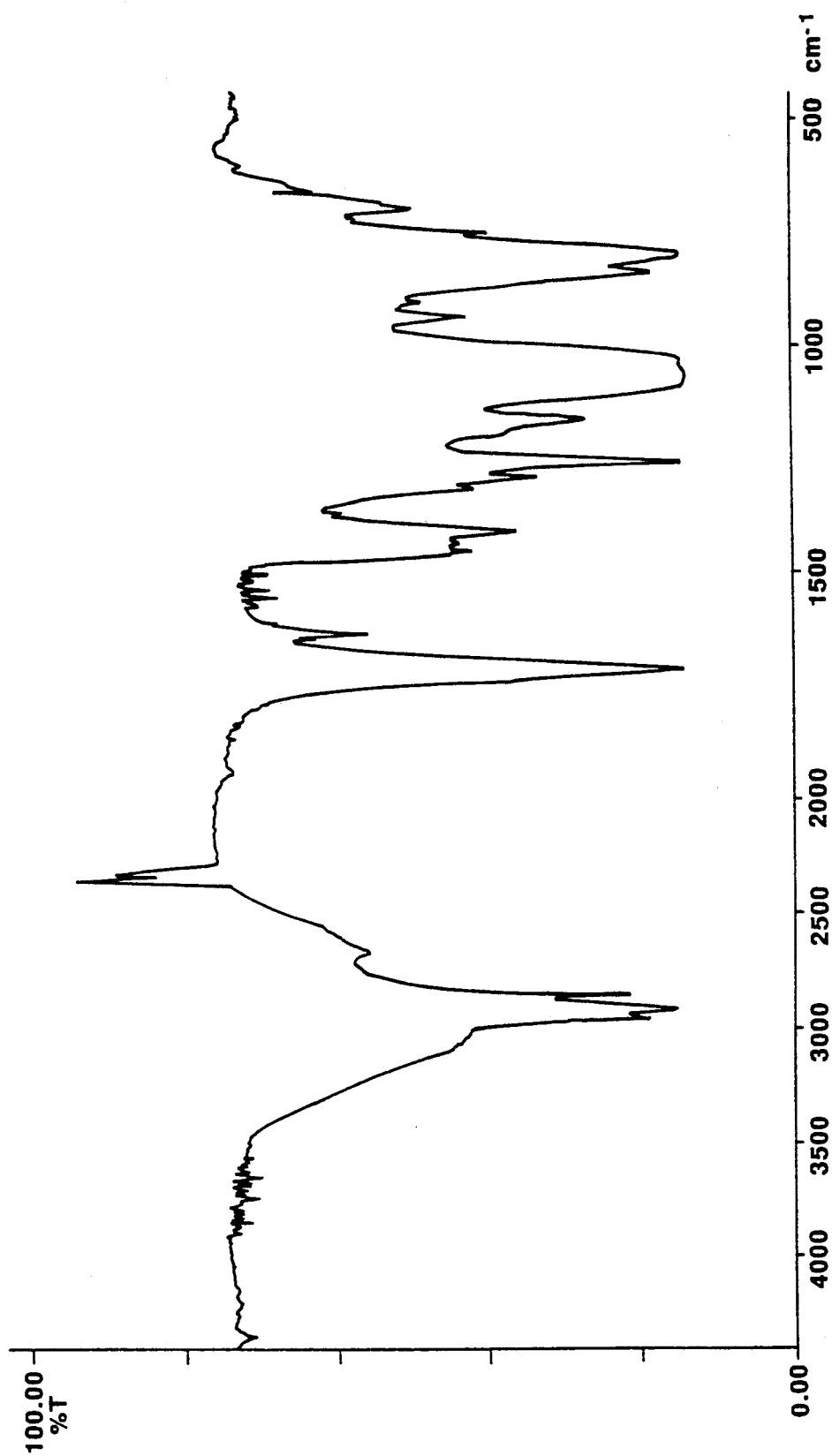
FIG. 6 is an infrared absorption spectrum of the product of Example 6.

Viscosity: 72 cs (25° C.)
Elemental analysis: Found: C: 48.9%, H: 8.2% Calc. C: 47.8%, H: 9.1%
$^1$H-NMR (acetone 2.0 ppm standard)
0.09 57H
0.52 6H
1.25 34H
2.04 3H
2.40 4H
4.15 2H
5.62 1H
6.15 1H
IR absorption spectrum: FIG. 6

Although some preferred embodiments have been described, many modifications and variations may be made thereto in the light of the above teachings. It is therefore to be understood that within the scope of the appended claims, the invention may be practiced otherwise than as specifically described.

We claim:

1. An organopolysiloxane of the average compositional formula (1):

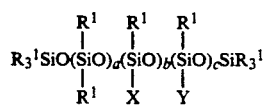

wherein X is an acryloxypropyl or methacryloxypropyl group,
Y is an organic group selected from the group consisting of carboxyethyl, carboxypropyl and carboxydecyl groups,
$R^1$ is an alkyl group having 1 to 6 carbon atoms or a phenyl group,
letters a, b and c are integers in the range: $0 \leq a \leq 100$, $1 \leq b \leq 20$, and $1 \leq c \leq 20$.

2. An organopolysiloxane of the average compositional formula (2):

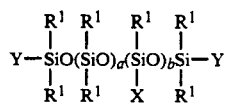

wherein X is an acryloxypropyl or methacryloxypropyl group,
Y is an organic group selected from the group consisting of carboxyethyl, carboxypropyl and carboxydecyl groups,
$R^1$ is an alkyl group having 1 to 6 carbon atoms or a phenyl group,
letters a and b are integers in the range: $0 \leq a \leq 100$ and $1 \leq b \leq 20$.

3. An organopolysiloxane according to claim 1, wherein X is selected from the group consisting of 2-acryloxypropyl, 3-acryloxypropyl and 3-methacryloxypropyl and each $R^1$ is independently selected from the group consisting of methyl and phenyl.

4. An organopolysiloxane according to claim 2, wherein X is selected from the group consisting of 2-acryloxypropyl, 3-acryloxypropyl and 3-methacryloxypropyl and each $R^1$ is independently selected from the group consisting of methyl and phenyl.

5. An organopolysiloxane according to claim 3, wherein the $R^1$ substituents are 5–50 mole % phenyl groups.

6. An organopolysiloxane according to claim 4, wherein the $R^1$ substituents are 5–50 mole % phenyl groups.

7. An organopolysiloxane according to claim 1 of the formula

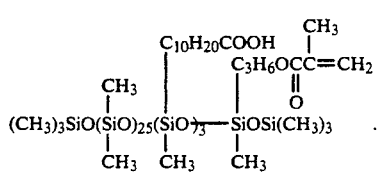
8. An organopolysiloxane according to claim 1 of the formula
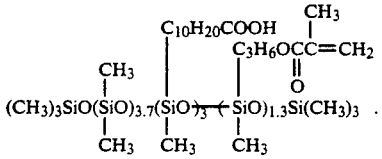
9. An organopolysiloxane according to claim 1 of the formula
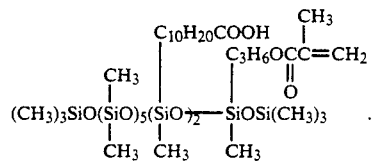
10. An organopolysiloxane according to claim 2 of the formula
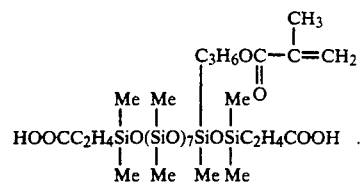
11. An organopolysiloxane according to claim 2 of the formula
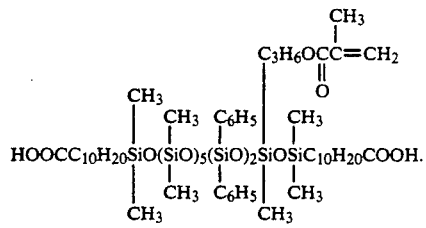
12. An organopolysiloxane according to claim 2 of the formula
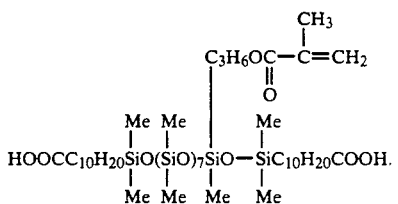
* * * * *